US008371925B2

(12) United States Patent
Bonney et al.

(10) Patent No.: US 8,371,925 B2
(45) Date of Patent: Feb. 12, 2013

(54) GAMING MACHINE WITH DYNAMIC BONUS LIMITING FEATURE

(75) Inventors: James P. Bonney, Chicago, IL (US); Michael Mastropietro, Chicago, IL (US)

(73) Assignee: WMS Gaming Inc., Waukegan, IL (US)

( * ) Notice: Subject to any disclaimer, the term of this patent is extended or adjusted under 35 U.S.C. 154(b) by 2317 days.

(21) Appl. No.: 10/207,592

(22) Filed: Jul. 29, 2002

(65) Prior Publication Data

US 2004/0018874 A1 Jan. 29, 2004

(51) Int. Cl.
*A63F 9/24* (2006.01)
*A63F 13/00* (2006.01)

(52) U.S. Cl. ................ 463/20; 463/16; 463/25; 463/29; 463/42

(58) Field of Classification Search .............. 463/16–20, 463/25, 42; 273/138.1–138.2, 143 R, 148 R
See application file for complete search history.

(56) References Cited

U.S. PATENT DOCUMENTS 4,227,690 A * 10/1980 Pitkanen ........................ 273/445
4,327,919 A 5/1982 Vennor
4,695,053 A 9/1987 Vazquez, Jr.
5,034,807 A 7/1991 Von Kohorn
5,342,047 A 8/1994 Heidel et al.
5,890,962 A 4/1999 Takemoto
5,944,314 A 8/1999 Stavinsky
5,951,397 A 9/1999 Dickinson
5,997,401 A 12/1999 Crawford
6,015,346 A 1/2000 Bennett
6,089,976 A * 7/2000 Schneider et al. .............. 463/16
6,102,798 A * 8/2000 Bennett ........................... 463/16
6,126,542 A 10/2000 Fier
6,159,097 A * 12/2000 Gura ............................... 463/20
6,159,098 A 12/2000 Slomiany et al.
6,164,652 A 12/2000 Lauretta et al.
6,174,235 B1 1/2001 Walker et al.
6,190,255 B1 2/2001 Thomas et al.
6,203,429 B1 3/2001 Demar et al.

(Continued)

FOREIGN PATENT DOCUMENTS

JP 07185126 7/1995
JP 2000014933 1/2000

(Continued)

OTHER PUBLICATIONS

Brochure for “Megasaurus”, Unidesa Gaming, Barcelona, Spain, 4 pages, undated.

*Primary Examiner* — Dmitry Suhol
*Assistant Examiner* — Ryan Hsu
(74) *Attorney, Agent, or Firm* — Nixon Peabody LLP

(57) ABSTRACT

A gaming machine includes a dynamic, bonus limiting game feature. In response to a wager, the machine conducts a basic game that, among its plurality of possible outcomes, includes a start-feature outcome for triggering the game feature. In one game feature example, the machine receives a selection of at least one of a plurality of different bonus limiting elements, and then receives successive selections of a plurality of selectable game elements until the selected game element has a predefined association with the selected bonus limiting element. In another game feature example, the machine receives successive selections of a plurality of selectable game elements until the selected game element is associated with a bonus-limiting outcome. The bonus-limiting outcome is assigned to a varying number of the selectable game elements from game to game.

12 Claims, 17 Drawing Sheets

U.S. PATENT DOCUMENTS

| | | | | |
|---|---|---|---|---|
| 6,210,279 | B1 | 4/2001 | Dickinson | |
| 6,261,177 | B1 | 7/2001 | Bennett | 463/16 |
| 6,270,411 | B1 * | 8/2001 | Gura et al. | 463/20 |
| 6,315,664 | B1 * | 11/2001 | Baerlocher et al. | 463/21 |
| 6,319,124 | B1 * | 11/2001 | Baerlocher et al. | 463/20 |
| 6,322,309 | B1 | 11/2001 | Thomas et al. | 413/20 |
| 6,346,043 | B1 | 2/2002 | Colin et al. | 463/17 |
| 6,347,996 | B1 * | 2/2002 | Gilmore et al. | 463/17 |
| 6,425,824 | B1 * | 7/2002 | Baerlocher et al. | 463/16 |
| 6,439,995 | B1 * | 8/2002 | Hughs-Baird et al. | 463/20 |
| 6,598,880 | B2 * | 7/2003 | Addabbo | 273/306 |
| 6,632,141 | B2 * | 10/2003 | Webb et al. | 463/25 |
| 6,746,327 | B2 * | 6/2004 | Frohm et al. | 463/16 |
| 6,769,986 | B2 * | 8/2004 | Vancura | 463/30 |

FOREIGN PATENT DOCUMENTS

| | | |
|---|---|---|
| JP | 2000245949 | 9/2000 |
| JP | 2000254350 | 9/2000 |

* cited by examiner

GAMING MACHINE WITH DYNAMIC BONUS LIMITING FEATURE

FIELD OF THE INVENTION

The present invention relates generally to gaming machines and, more particularly, to a gaming machine with a dynamic bonus limiting feature.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines. Shrewd operators consequently strive to employ the most entertaining and exciting machines available because such machines attract frequent play and hence increase profitability to the operator. Accordingly, in the competitive gaming machine industry, there is a continuing need for gaming machine manufacturers to produce new types of games, or enhancements to existing games, which will attract frequent play by enhancing the entertainment value and excitement associated with the game.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome of the basic game. Because the bonus game concept offers tremendous advantages in player appeal and excitement relative to other known games, and because such games are attractive to both players and operators, there is a continuing need to develop new features and themes for bonus games to satisfy the demands of players and operators. Preferably, such new bonus game features and themes will maintain, or even further enhance, the level of player excitement offered by bonus games heretofore known in the art. The present invention is directed to satisfying these needs.

SUMMARY OF THE INVENTION

A gaming machine includes a dynamic, bonus limiting game feature. In response to a wager, the machine conducts a basic game that, among its plurality of possible outcomes, includes a start-feature outcome for triggering the game feature. In one game feature example, the machine receives a selection of at least one of a plurality of different bonus limiting elements, and then receives successive selections of a plurality of selectable game elements until the selected game element has a predefined association with the selected bonus limiting element. In another game feature example, the machine receives successive selections of a plurality of selectable game elements until the selected game element is associated with a bonus-limiting outcome such as an end-feature outcome. The bonus-limiting outcome is assigned to a varying number of the selectable game elements from game to game.

BRIEF DESCRIPTION OF THE DRAWINGS

The foregoing and other advantages of the invention will become apparent upon reading the following detailed description and upon reference to the drawings in which.

Figure 1:
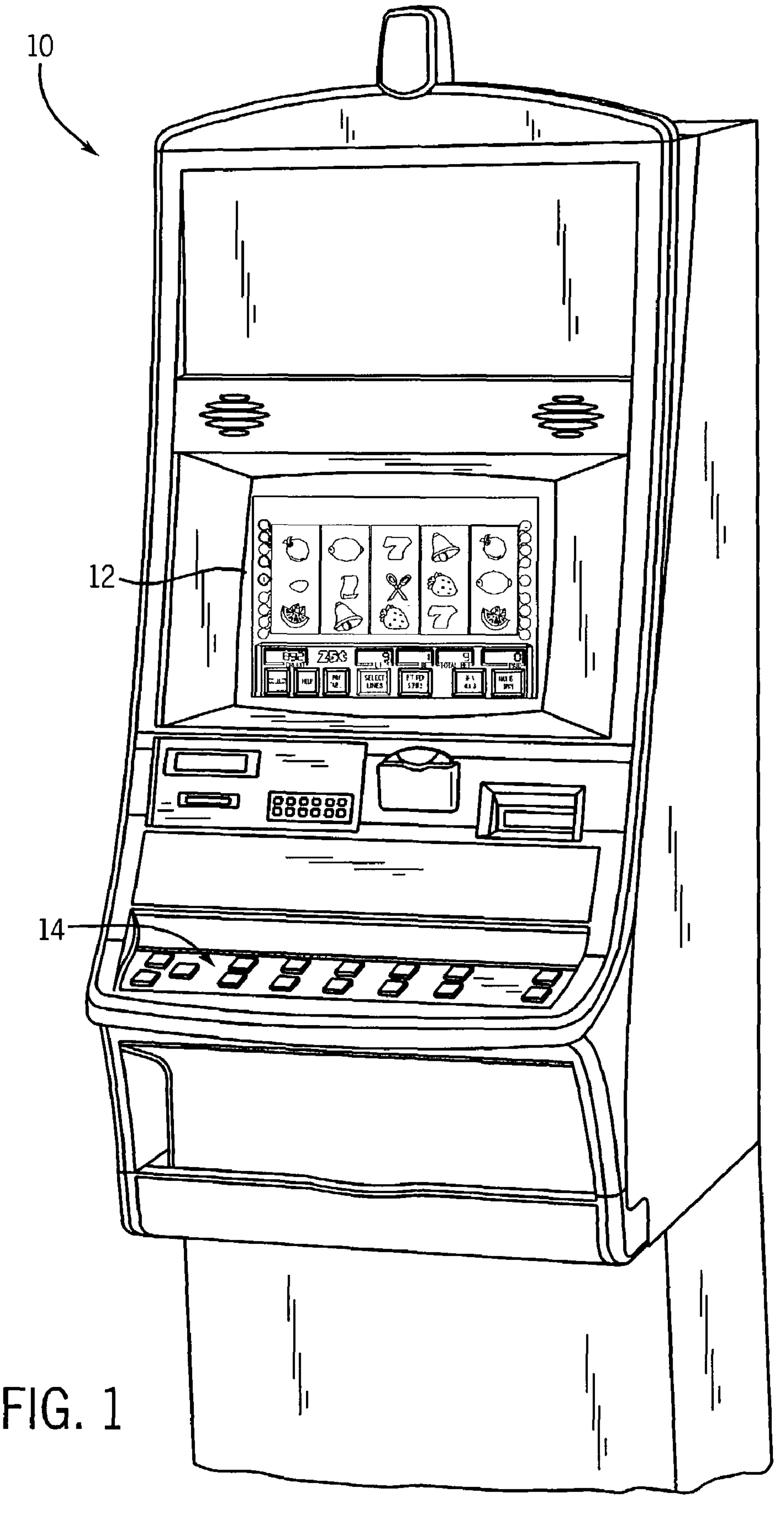
FIG. 1 is a perspective view of a gaming machine embodying the present invention.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents, and alternatives falling within the spirit and scope of the invention as defined by the appended claims.

DESCRIPTION OF SPECIFIC EMBODIMENTS

Turning now to the drawings and referring initially to FIG. 1, a gaming machine 10 is operable to play a game of chance having a rock-paper-scissors (RPS) theme. The game of chance features a basic slot game with five simulated spinning reels and an RPS game feature triggered by a start-feature outcome in the basic slot game. In addition to the RPS game feature, the basic slot game may produce certain outcomes for triggering other special features and bonus games. The gaming machine 10 includes a visual display 12 preferably in the form of a dot matrix, CRT, LED, LCD, electro-luminescent, or other type of video display known in the art. The display 12 preferably includes a touch screen overlaying the monitor. In the illustrated embodiment, the gaming machine 10 is an "upright" version in which the display 12 is oriented vertically relative to the player. Alternatively, the gaming machine may be a "slant-top" version in which the display 12 is slanted at about a thirty-degree angle toward the player of the gaming machine 10.

Figure 2:
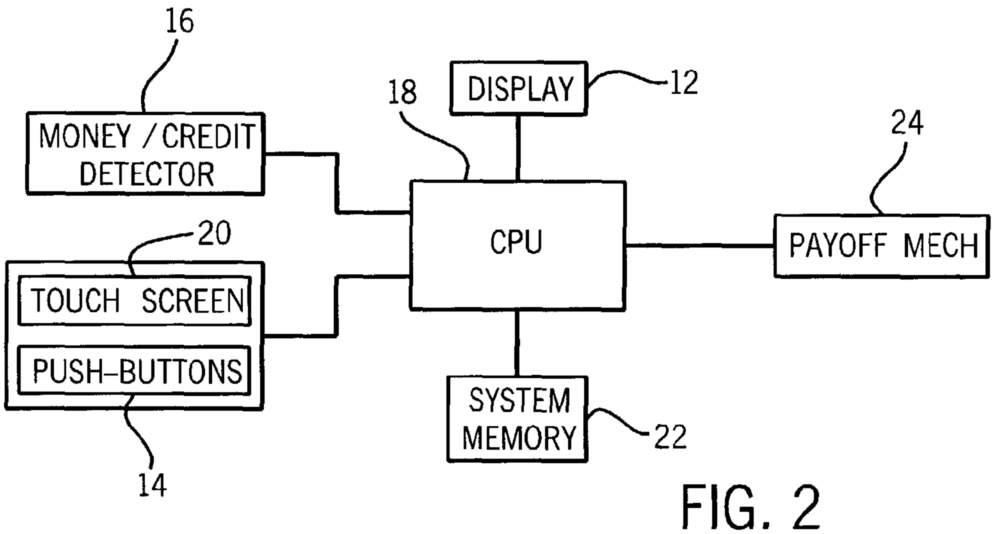
FIG. 2 is a block diagram of a control system suitable for operating the gaming machine.

FIG. 2 is a block diagram of a control system suitable for operating the gaming machine 10. Money/credit detector 16 signals a central processing unit ("CPU") 18 when a player has inserted money or played a number of credits. The money may be provided by coins, bills, tickets, coupons, cards, etc. Then, the CPU 18 operates to execute a game program that causes the display 12 to display five simulated symbol-bearing reels. The player may select a number of pay lines to play, an amount to wager, and start game play via the touch screen 20 or the push-buttons 14, causing the CPU 18 to set the reels in motion, randomly select a game outcome, and then stop the reels to display symbols corresponding to the pre-selected game outcome. In one embodiment, one of the basic game outcomes triggers the RPS game feature.

A system memory 22 stores control software, operational instructions and data associated with the gaming machine 10. In one embodiment, the system memory 22 comprises a separate read-only memory (ROM) and battery-backed random-access memory (RAM). However, it will be appreciated that the system memory 22 may be implemented on any of several alternative types of memory structures or may be implemented on a single memory structure. A payoff mechanism 24 is operable in response to instructions from the CPU 18 to award a payoff to the player in response to certain winning outcomes that might occur in the basic game or RPS game feature. The payoff amounts are determined by one or more pay tables stored in the system memory 22.

Figure 3:
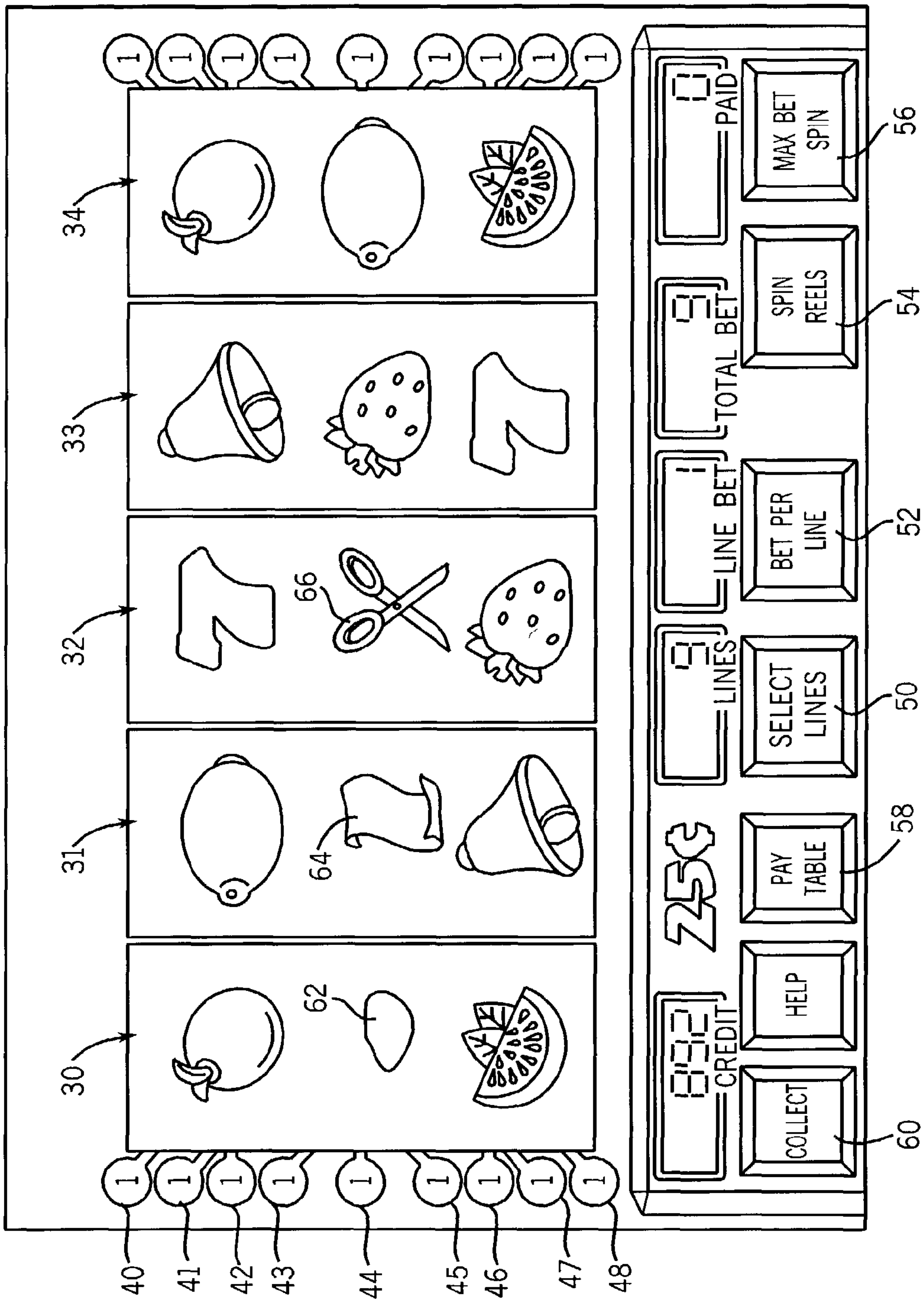
FIG. 3 is a display screen image associated with a first basic slot game and showing a rock-paper-scissors symbol combination for triggering a rock-paper-scissors (RPS) game feature.

Referring to FIG. 3, the basic game is implemented on the display 12 on five video simulated spinning reels 30, 31, 32, 33, and 34 with nine pay lines 40, 41, 42, 43, 44, 45, 46, 47, and 48. Each of the pay lines extends through one symbol on each of the five reels. Generally, game play is initiated by inserting money or playing a number of credits, causing the CPU to activate a number of pay lines corresponding to the amount of money or number of credits played. In one embodiment, the player selects the number of pay lines (between one and nine) to play by pressing a "Select Lines" key 50 on the video display 12. The player then chooses the number of coins or credits to bet on the selected pay lines by pressing the "Bet Per Line" key 52.

After activation of the pay lines, the reels may be set in motion by touching the "Spin Reels" key 54 or, if the player wishes to bet the maximum amount per line, by using the "Max Bet Spin" key 56 on the video display 12. Alternatively, other mechanisms such as, for example, a lever or push button may be used to set the reels in motion. The CPU uses a random number generator to select a game outcome (e.g., "basic" game outcome) corresponding to a particular set of reel "stop positions." The CPU then causes each of the video reels to stop at the appropriate stop position. Video symbols are displayed on the reels to graphically illustrate the reel stop positions and indicate whether the stop positions of the reels represent a winning game outcome.

Winning basic game outcomes (e.g., symbol combinations resulting in payment of coins or credits) are identifiable to the player by a pay table. In one embodiment, the pay table is affixed to the machine 10 and/or displayed by the video display 12 in response to a command by the player (e.g., by pressing the "Pay Table" button 58). A winning basic game outcome occurs when the symbols appearing on the reels along an active pay line correspond to one of the winning combinations on the pay table. A winning combination, for example, could be three or more matching symbols along an active pay line, where the award is greater as the number of matching symbols along the active pay line increases. If the displayed symbols stop in a winning combination, the game credits the player an amount corresponding to the award in the pay table for that combination multiplied by the amount of credits bet on the winning pay line. The player may collect the amount of accumulated credits by pressing the "Collect" button 60. The credits may be collected in the form of coins, bills, tickets, coupons, cards, etc. In one implementation, the winning combinations start from the first reel 30 (left to right) and span adjacent reels. In an alternative implementation, the winning combinations start from either the first reel 30 (left to right) or the fifth reel 34 (right to left) and span adjacent reels.

Included among the plurality of basic game outcomes is a start-feature outcome for triggering play of the RPS game feature. A start-feature outcome may be defined in any number of ways. For example, a start-feature outcome occurs when a special start-feature symbol or a special combination of symbols appears on one or more of the reels. The start-feature outcome may require the combination of symbols to appear along an active pay line, or may alternatively require that the combination of symbols appear anywhere on the display regardless of whether the symbols are along an active pay line. The appearance of a start-feature outcome causes the CPU to shift operation from the basic game to the RPS game feature of the present invention. In the embodiment illustrated in FIG. 3, a combination of a rock (R) symbol 62, a paper (P) symbol 64, and a scissors (S) symbol 66 along an active pay line triggers the RPS game feature.

Figure 4:
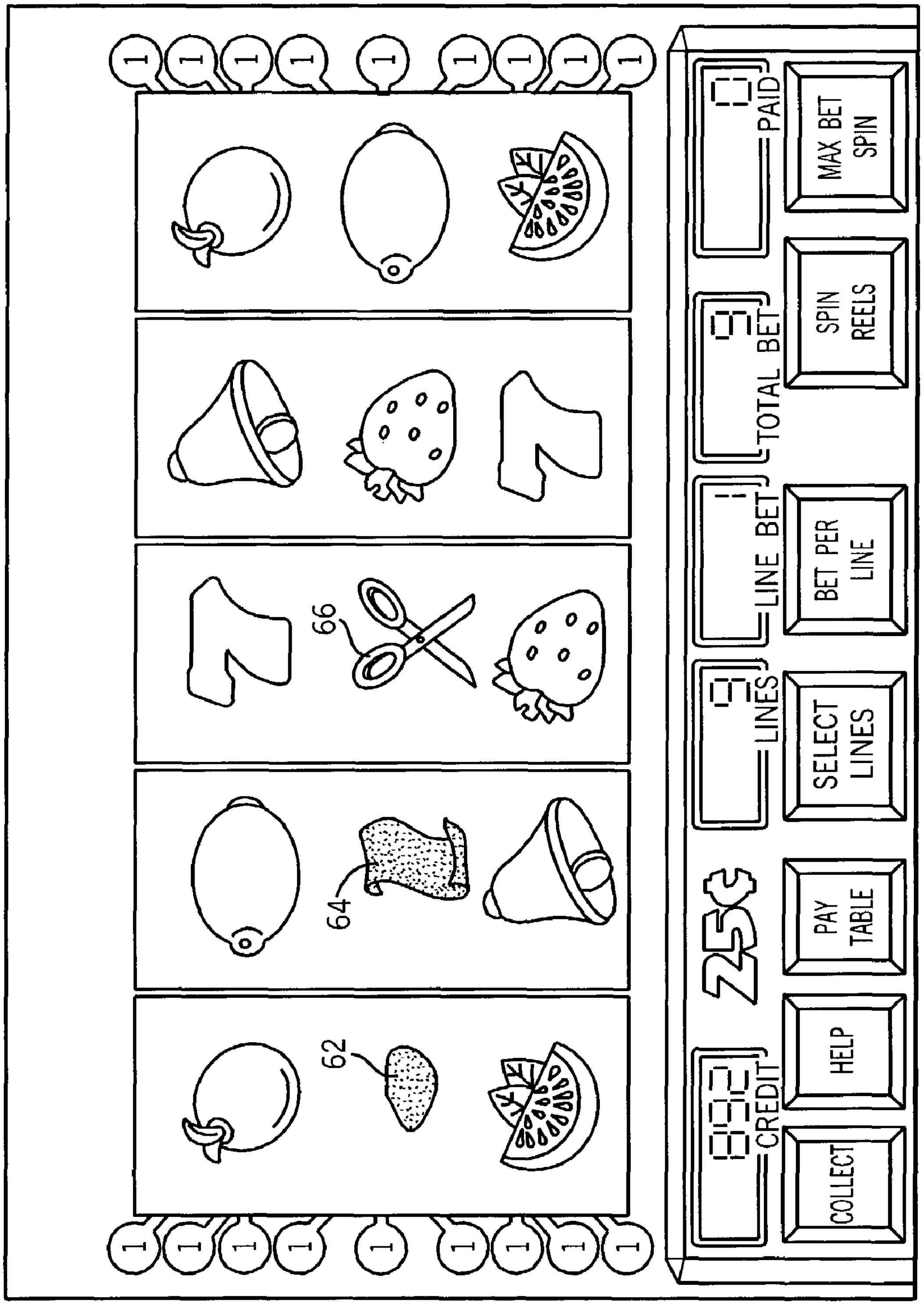
FIG. 4 is a display screen image associated with a first phase of the RPS game feature in which a player selects rock, paper, or scissors from the triggering symbol combination.

Referring to FIG. 4, in a first phase of the RPS game feature the player is prompted to select one of the triggering symbols, i.e., the rock symbol 62, the paper symbol 64, or the scissors symbol 66. In the illustrated example, the player selects the scissors symbol 66. The non-selected rock symbol 62 and the non-selected paper symbol 64 are grayed out. The CPU may provide a bonus award for the selected triggering symbol. The selected bonus triggering symbol is referred to below as a "first phase RPS symbol."

Figure 5:
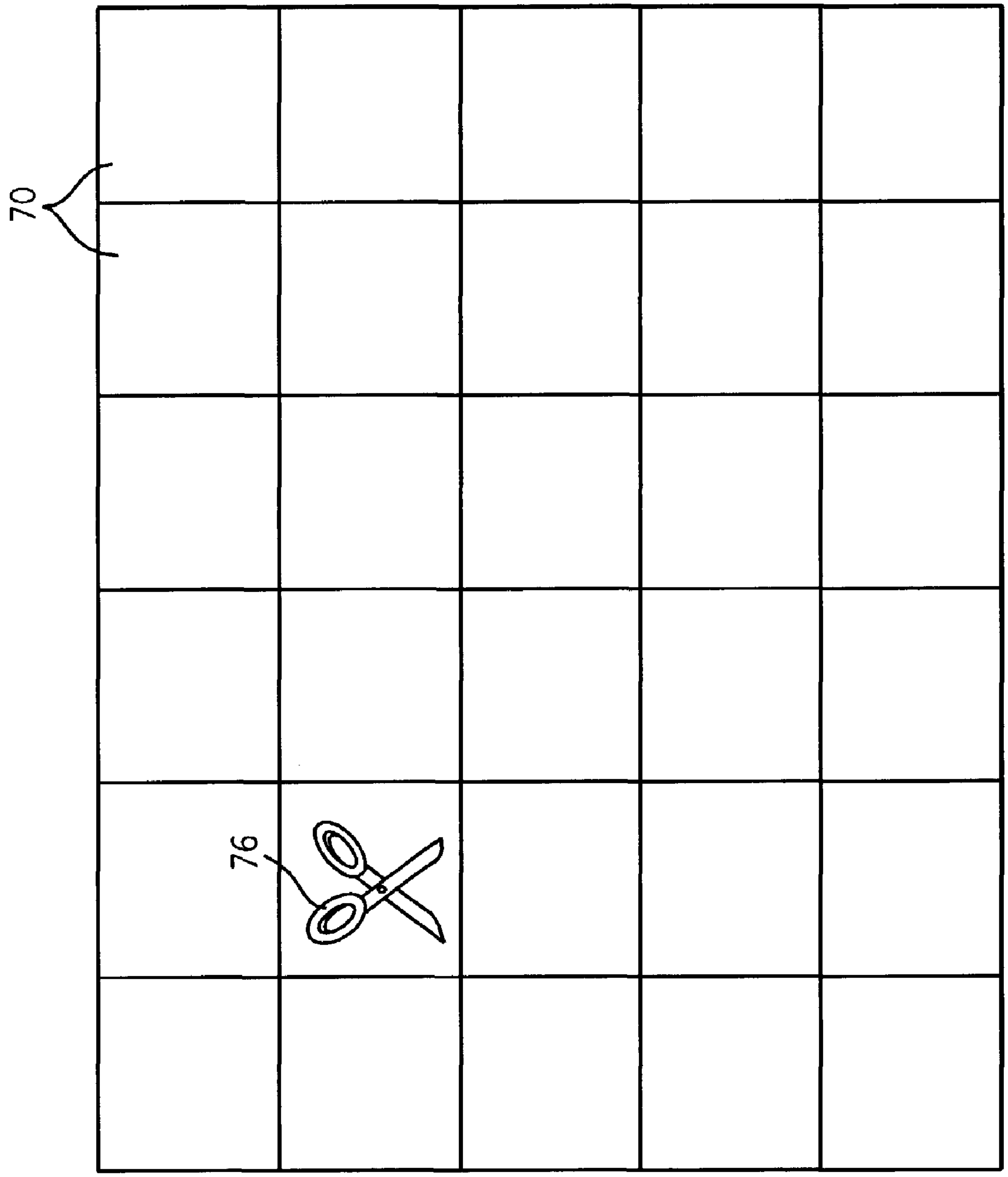
FIGS. 5 through 11 are display screen images associated with a second phase of the RPS game feature.

Referring to FIG. 5, in the second phase of the RPS game feature, after the player selects the first phase RPS symbol the basic game image on the display 12 fades out and is replaced with a bonus game image including an array of selectable game elements 70. The array may, for example, include thirty tiles arranged in five rows and six columns. Each selectable game element 70 is assigned a rock symbol, a paper symbol, a scissors symbol, or miscellaneous other indicia such as credit amounts, "save", extra picks, etc. In the illustrated example, the tile assignments include 21 random credit amounts (e.g., a multiplier times the player's line bet), three rock (R) symbols, three paper (P) symbols, and three scissors (S) symbols. The indicia associated with a selectable game element is initially concealed but is revealed upon selection of that game element. The bonus game image may also include a scoreboard (not shown) that keeps track of the accumulated bonus and the number of rock, paper, and scissors symbols selected.

Figure 6:
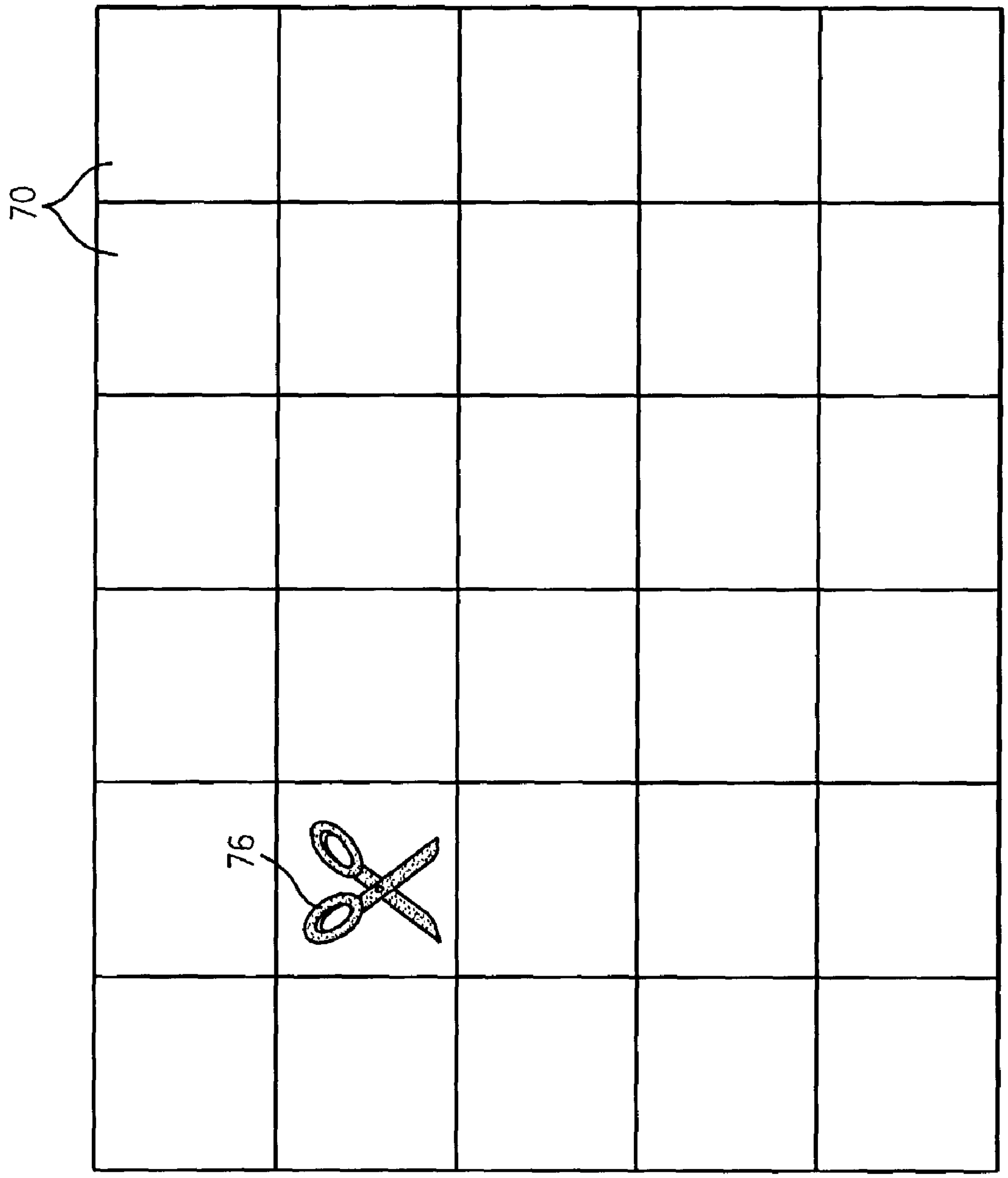

At the start of the second phase of the RPS game feature, one of the tiles that corresponds to the first phase RPS symbol is automatically revealed (without player input) and therefore effectively removed from the array. In the illustrated example, because the first phase RPS symbol in FIG. 4 was the scissors symbol 66, a scissors symbol 76 is revealed and immediately grayed out as shown in FIGS. 5 and 6.

The player is then prompted to successively select game elements 70 from the array until a selected game element 70 reveals an RPS symbol that beats the first phase RPS symbol in FIG. 4. In accordance with the RPS theme, rock wins against scissors, loses to paper, and stalemates against itself. Similarly, paper wins against rock, loses to scissors, and stalemates against itself Scissors wins against paper, loses to rock, and stalemates against itself. In the illustrated example, the scissors symbol 76 corresponds to the first phase RPS symbol in FIG. 4, and a rock symbol would beat the scissors symbol 76. As the player selects game elements 70, the selected game elements may yield random credit amounts and/or increase the final accumulated credit amount according to the following rules:

1. If the player selects a first of the three RPS symbol tiles that loses to the first phase RPS symbol in FIG. 4, the final credit amount is doubled. In the illustrated example, any paper tile loses to the scissors symbol 76.
2. If the player selects a second of the three RPS symbol tiles that loses to the first phase RPS symbol, the final credit amount is tripled.
3. If the player selects a third of the three RPS symbol tiles that loses to the first phase RPS symbol, the final credit amount is quadrupled.

4. If the player selects one of the three RPS symbol tiles that beats the first phase RPS symbol in FIG. 4, the RPS game feature ends unless prolonged by a "save" (see below). In the illustrated example, any rock tile beats the scissors symbol 76.
5. If the player selects one of the two remaining RPS symbol tiles that matches (stalemates against) the first phase RPS symbol in FIG. 4, the player acquires a "save" for prolonging the RPS game feature in the event the player later selects one of the three RPS symbol tiles that beats the first phase RPS symbol and normally ends the RPS game feature. In the illustrated example, any scissors tile stalemates against the scissors symbol 76.

It can be seen that the RPS game feature is dynamic because the game elements 70 that end the RPS game feature vary according to which first phase RPS symbol was previously selected by the player during the first phase of the RPS game feature.

Figure 7:
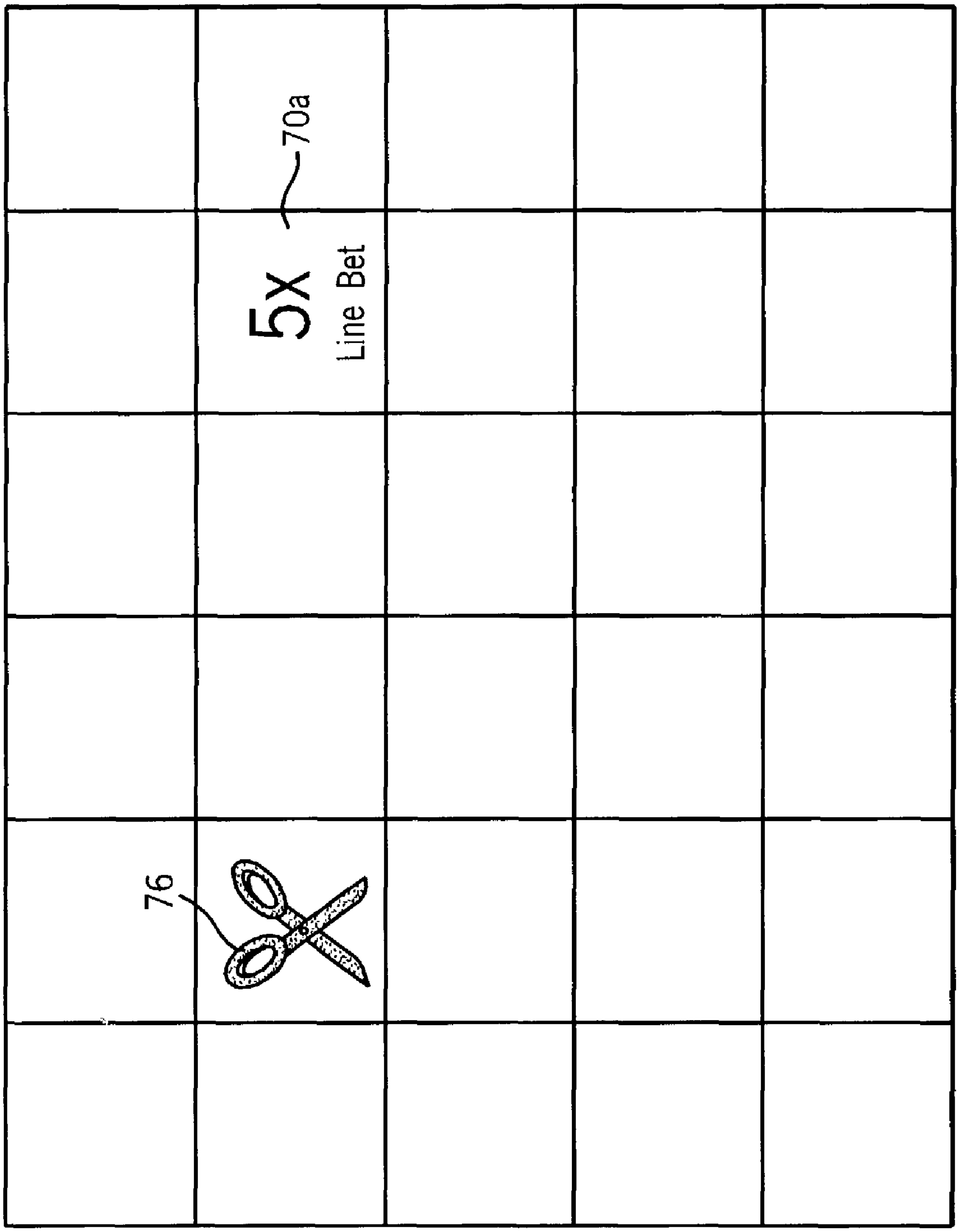
Figure 8:
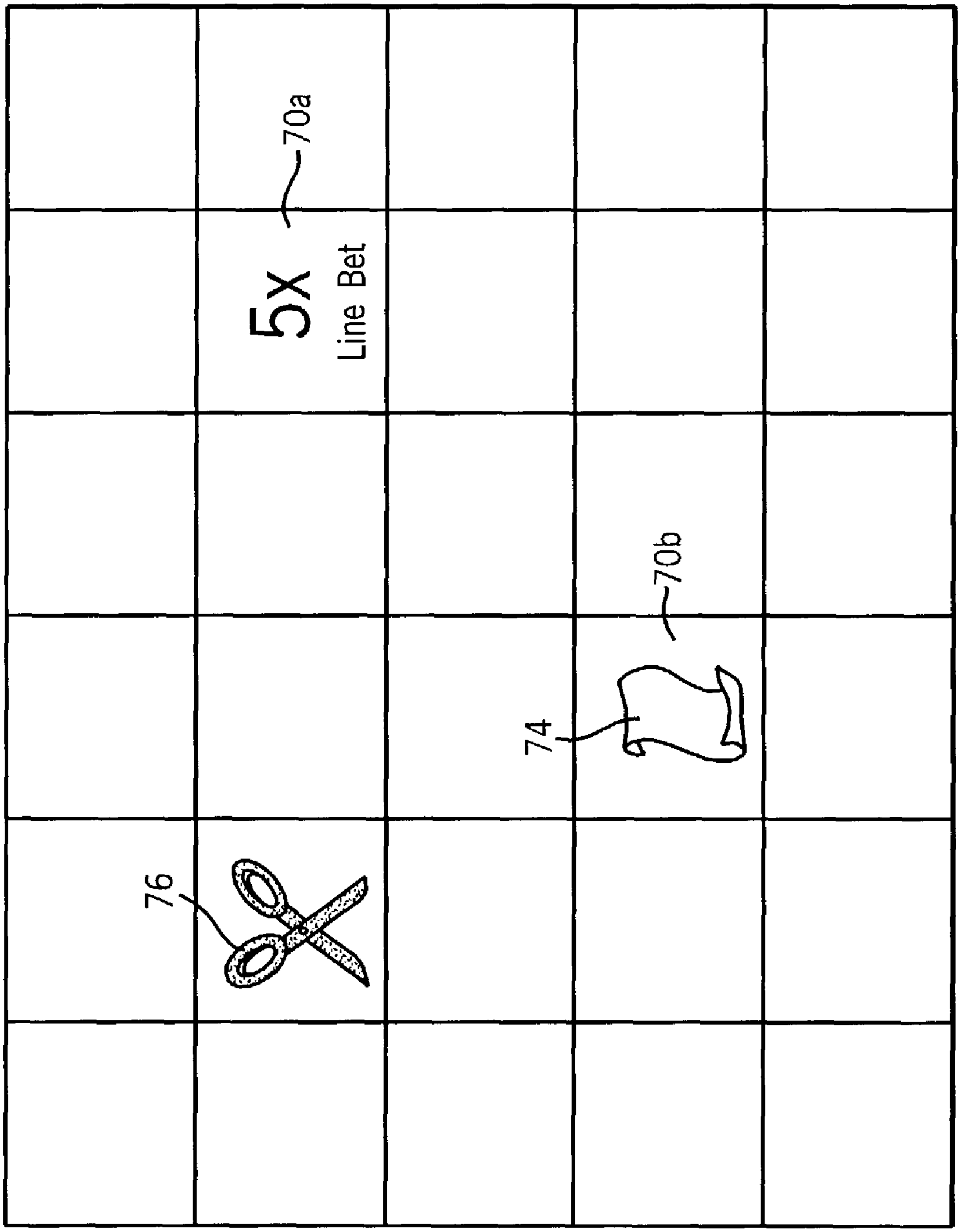
Figure 9:
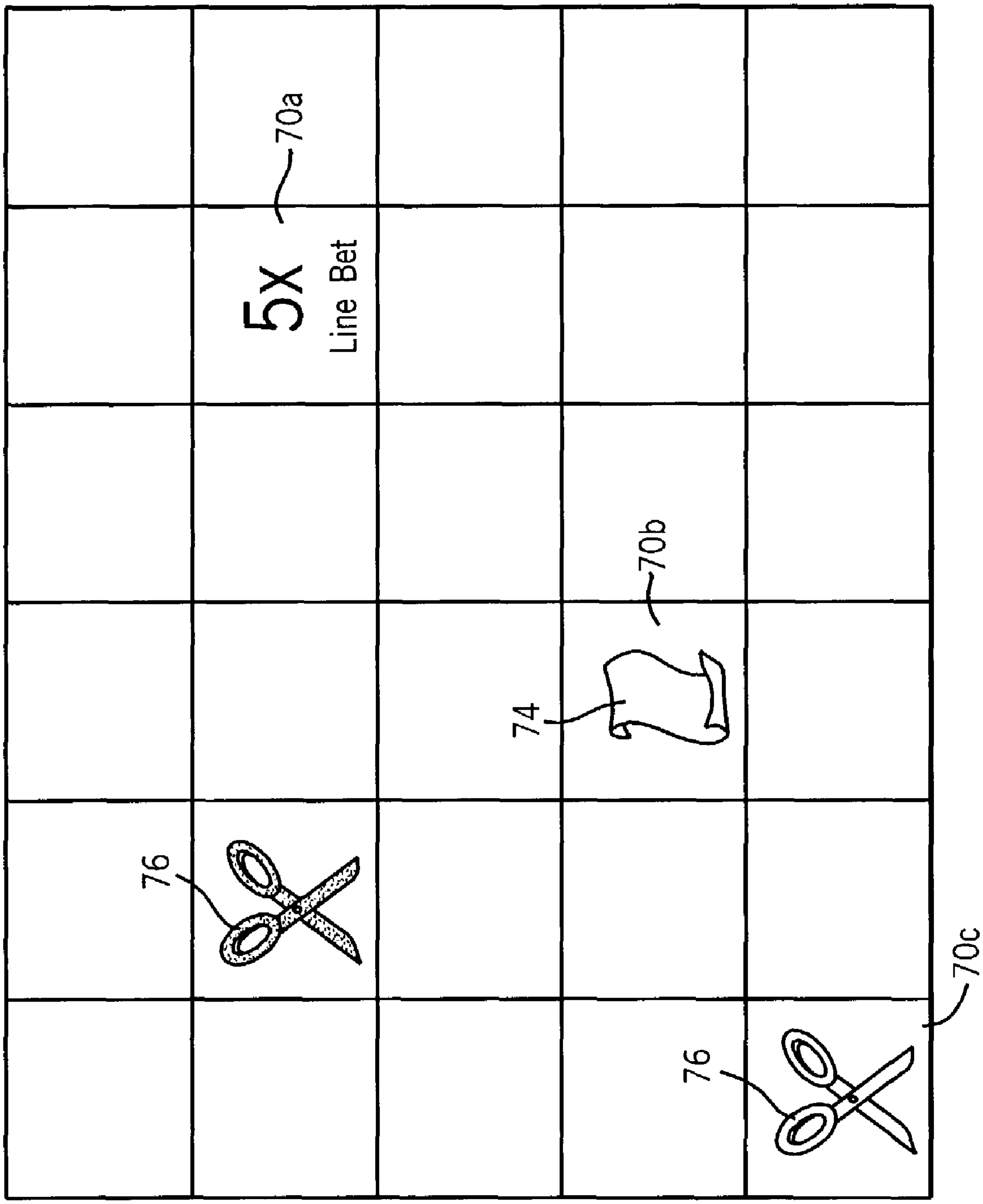
Figure 10:
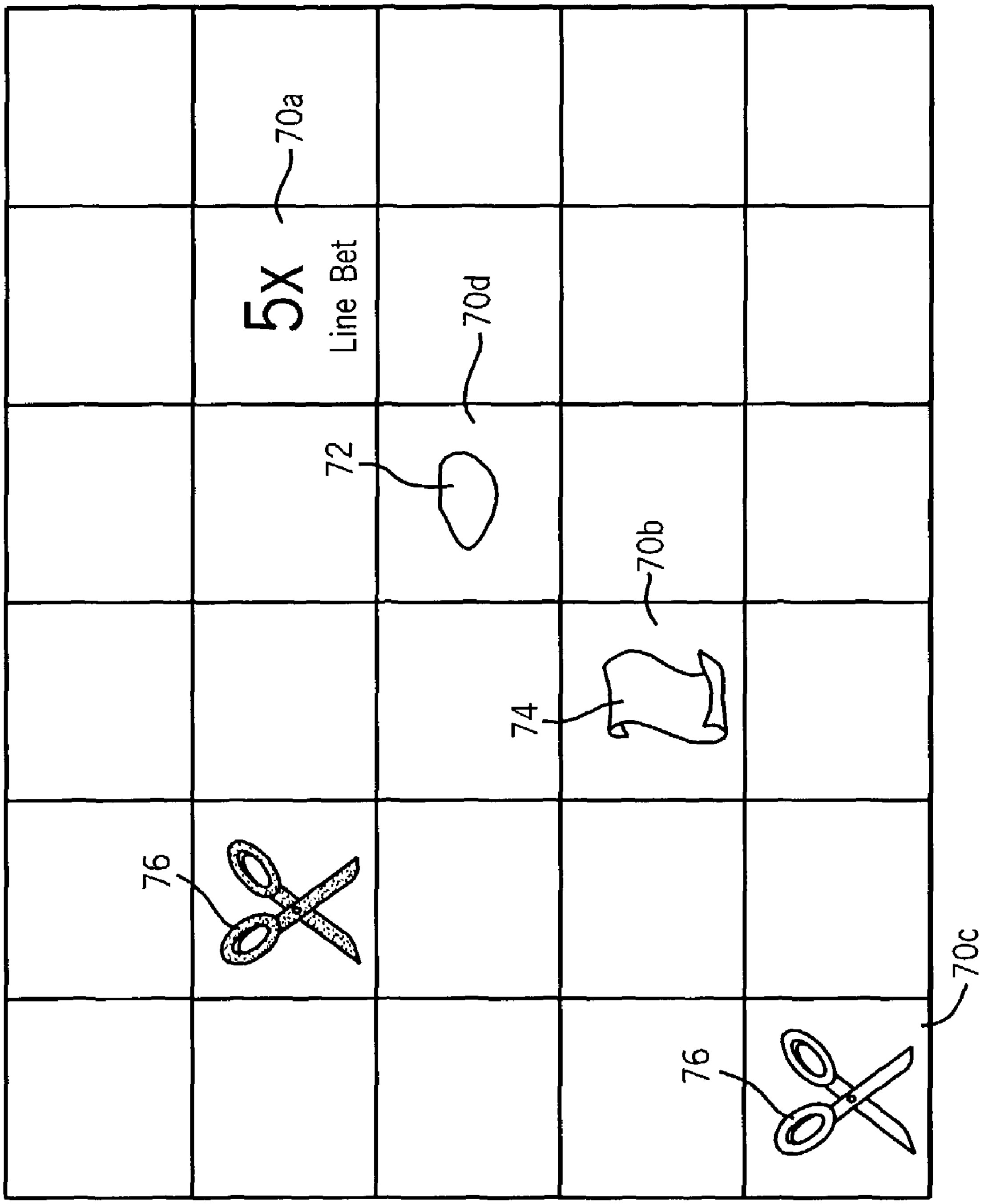
Figure 11:
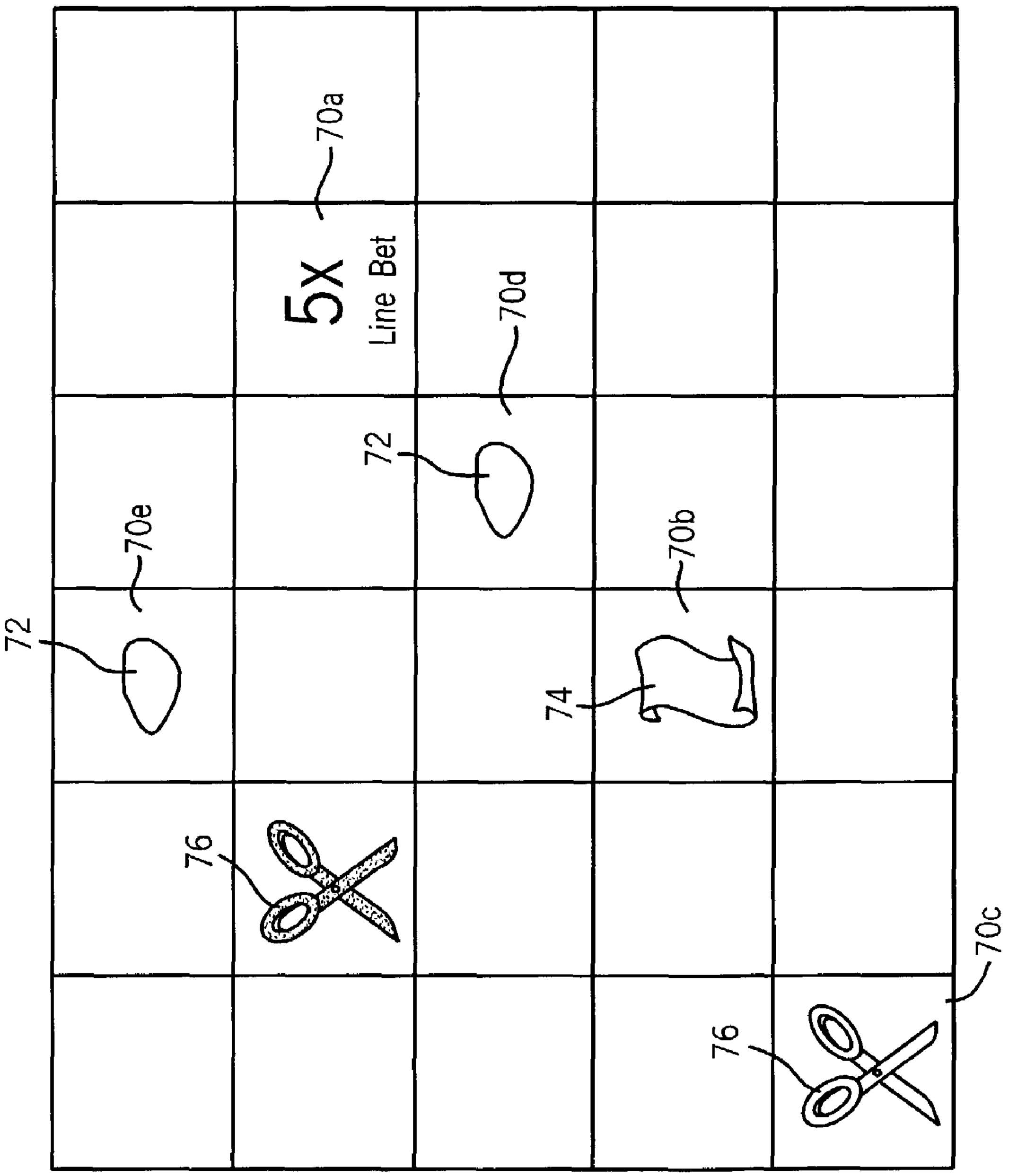

In the illustrated example, the RPS game feature proceeds as follows. In FIG. 7 the player selects a tile 70*a* that reveals a credit amount of five times (5×) the player's line bet. In FIG. 8 the player selects a tile 70*b* that reveals a paper symbol 74. Because the paper symbol 74 of tile 70*b* loses to the first phase scissors symbol 76, the final credit amount will be doubled. In FIG. 9 the player selects a tile 70*c* that reveals a scissors symbol 76. Because the scissors symbol 76 of tile 70*c* stalemates against the first phase scissors symbol 76, the player acquires a "save" for nullifying/overriding a rock symbol that may be revealed by a subsequent selection. In FIG. 10 the player selects a tile 70*d* that reveals a rock symbol 72. Because the rock symbol 72 of tile 70*d* beats the first phase scissors symbol 76, the RPS game feature would normally end except, in this case, it is prolonged with the "save" acquired in FIG. 9. Each use of a "save" decreases the number of accumulated "saves" by one. In FIG. 11 the player selects a tile 70*e* that reveals another rock symbol 72. Because the rock symbol 72 of tile 70*e* beats the first phase scissors symbol 76, and the player has no more "saves," the RPS game feature ends. The final accumulated credit amount of five times (5×) the player's line bet (due to tile 70*a*) is doubled (due to the paper symbol 74 of tile 70*b*) to yield a total bonus of ten times (10×) the player's line bet. After awarding the total bonus, the CPU shifts operation back to the basic slot game.

In the illustrated embodiment, all selections are preferably made by the player. If the display 12 is outfitted with a touch screen, a first phase RPS symbol in FIG. 4 or a game element 70 may be selected by touching the touch screen at the location of the element. In an alternative embodiment, the player selects a first phase RPS symbol in FIG. 4, while the CPU randomly and successively selects the game elements 70 in the array. In another alternative embodiment, the CPU selects a first phase RPS symbol in FIG. 4, while the player successively selects the game elements 70 in the array. In yet another alternative embodiment, all selections are made by the CPU without player input. Instead of ending the RPS game feature when a tile reveals an RPS symbol that beats the first phase RPS symbol in FIG. 4, the game feature may advance to a different phase (not shown).

Numerous variations may be made to the RPS game feature. For example, instead of selecting a single first phase RPS symbol in FIG. 4 for comparison against every selected game element 70 in the RPS game feature, the RPS game feature may be modified such that a new (same or different) first phase RPS symbol in FIG. 4 is selected prior to selecting each game element 70. For example, the rock symbol 62 in FIG. 4 may be selected for comparison against the first selected game element 70*a*. If the comparison does not yield a loss, the paper symbol 64 may be selected for comparison against the second selected game element 70*b*. If the comparison does not yield a loss, the paper symbol 64 may again be selected for comparison against the third selected game element 70*c*, and so on.

In addition, instead of displaying the first phase RPS symbols and game elements 70 on the video display 12, these elements may be displayed on one or more different types of feature indicators such as a mechanical display or a back-lit glass display. For example, the first phase RPS symbols may be displayed on different segments of a mechanical, back-lit glass, or video wheel. One of the first phase RPS symbols may be selected by spinning the wheel. The game elements 70 may be displayed on a different wheel, the video display 12 (as in the illustrated embodiment), or some other feature indicator.

Furthermore, instead of selecting the game elements 70 until the first phase RPS symbol loses to a selected game element 70, the "pick-til-you-lose" play mechanic may be inverted to a "pick-til-you-win" play mechanic such that the game elements 70 are selected until the first phase RPS symbol beats a selected game element 70.

Figure 12:
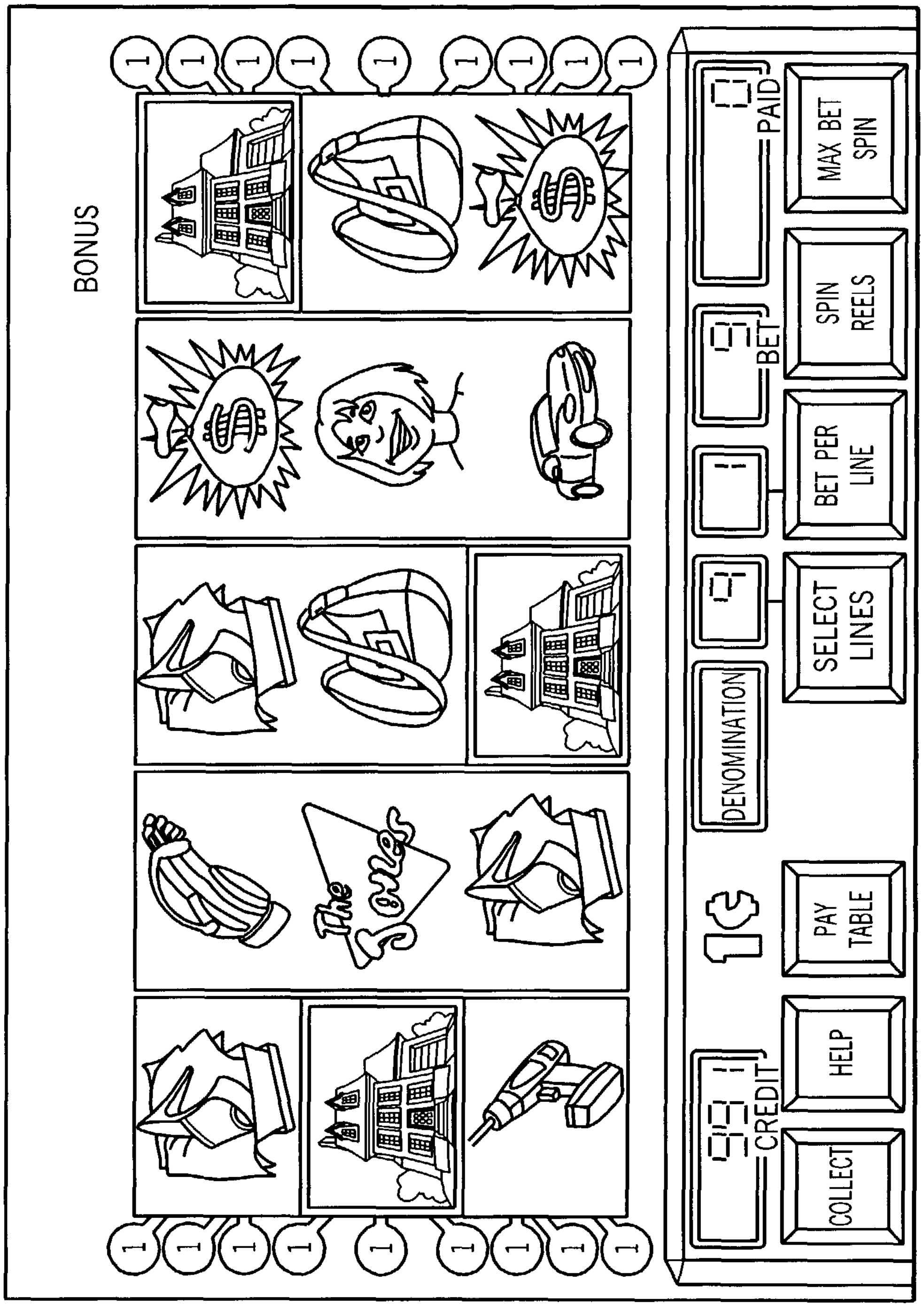
FIG. 12 is a display screen image associated with a second basic slot game and showing a symbol combination for triggering a house repair game feature.

FIG. 12 illustrates a second basic slot game having a different game theme. In this slot game, a combination of three HOUSE reel symbols anywhere on the display triggers a house repair game feature.

Figure 13:
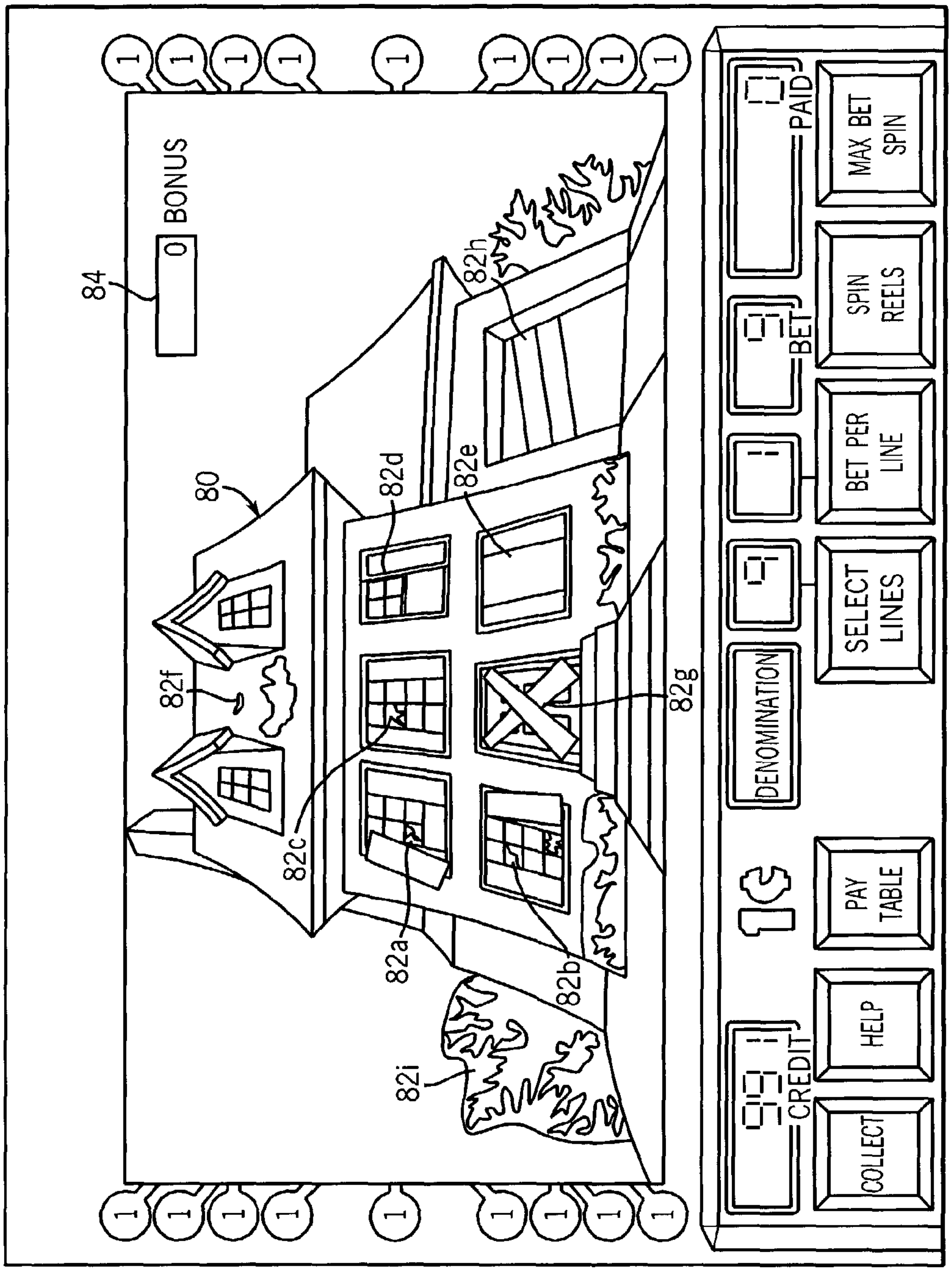
FIGS. 13 through 17 are display screen images associated with the house repair game feature.

Referring to FIG. 13, in response to triggering the house repair game feature, a window with an image of a house 80 in a state of disrepair appears on the reels. The house 80 includes an array of selectable game elements 82*a*, 82*b*, 82*c*, 82*d*, 82*e*, 82*f*, 82*g*, 82*h*, and 82*i* (collectively referred to by reference numeral 82). The selectable game elements 82 are areas of the house 80 that the player can choose to repair, thus increasing the value of the house 80 and awarding the player with credits. The areas may, for example, include five windows 82*a-e*, a roof 82*f*, a door 82*g*, a garage 82*h*, and landscaping (shrubs, lawn, etc.) 82*i*. Each selectable game element 82 yields either a continue-feature outcome or a bonus-limiting outcome that is revealed upon selection. The bonus-limiting outcome is preferably an end-feature outcome. On the one hand, the continue-feature outcome may award a variable number of credits and allow the player to select another one of the selectable game elements 82. On the other hand, the end-feature outcome may award a fixed number of credits and terminate play of the house repair game feature or a current phase of that feature. The end-feature outcome may be represented by negative indicia such as the term "MONEY PIT". A bonus meter 84 shows the number of credits accumulated in the house repair game feature.

The machine prompts the player to successively select game elements 82 from the array until either (1) all of the selectable game elements 82 have been selected or (2) a selection reveals an end-feature outcome ("MONEY PIT"), whichever occurs first. In accordance with the present invention, a variable number of the selectable game elements 82 are assigned an end-feature outcome. This variable number is preferably either one or zero, but may alternatively be any number ranging from zero to the total number of selectable game elements 82 (e.g., nine in the illustrated example).

Figure 14:
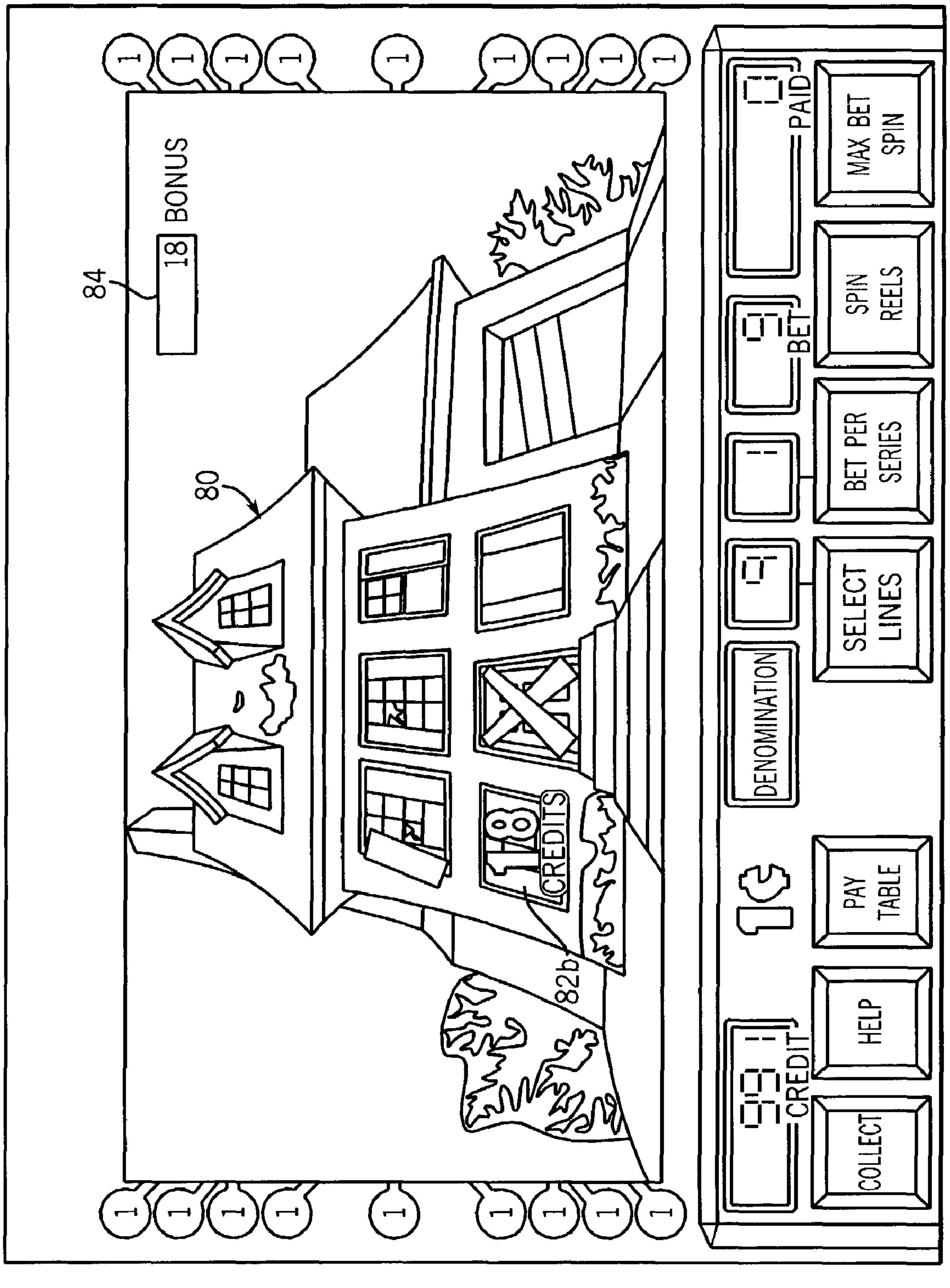
Figure 15:
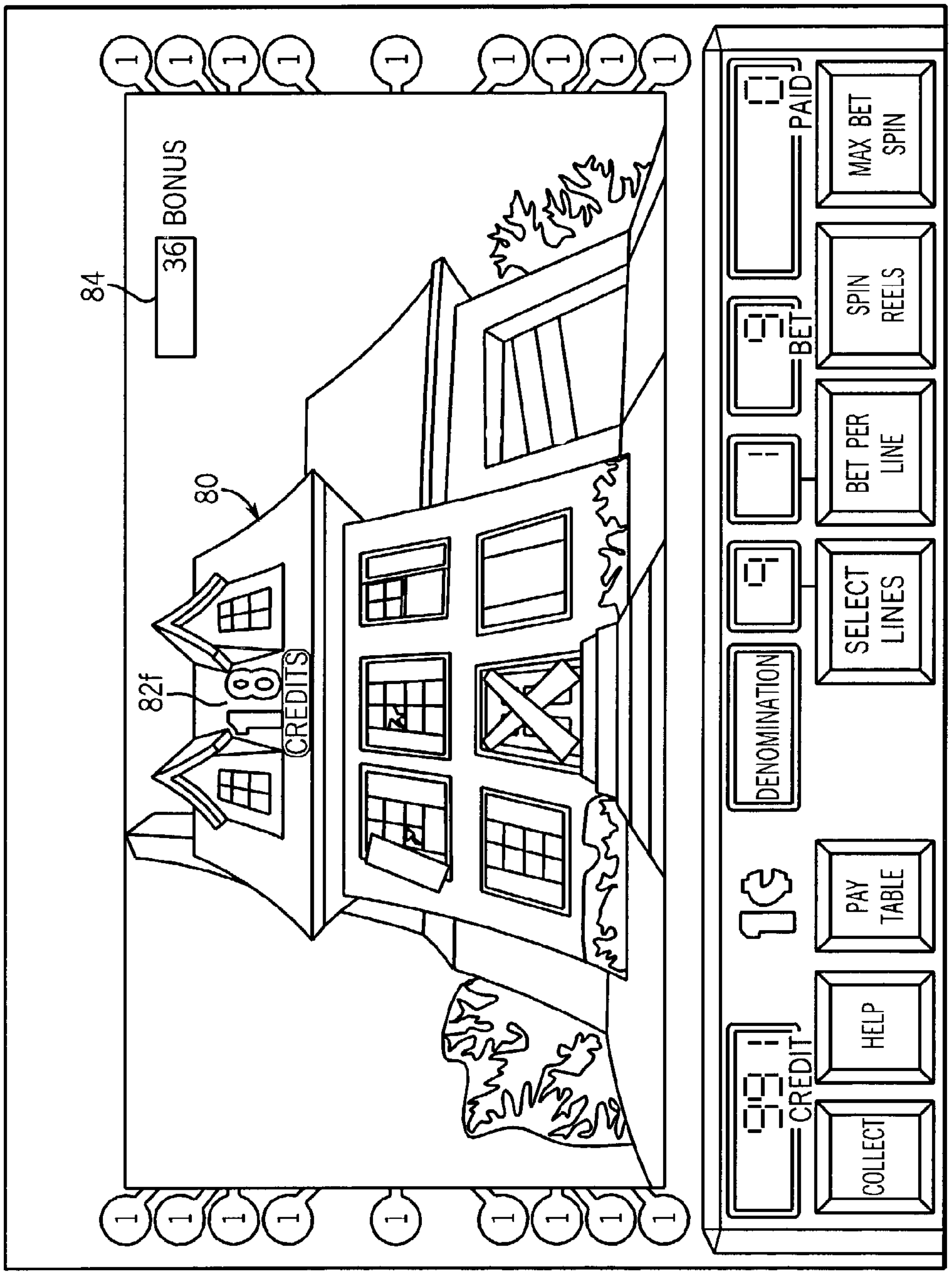
Figure 16:
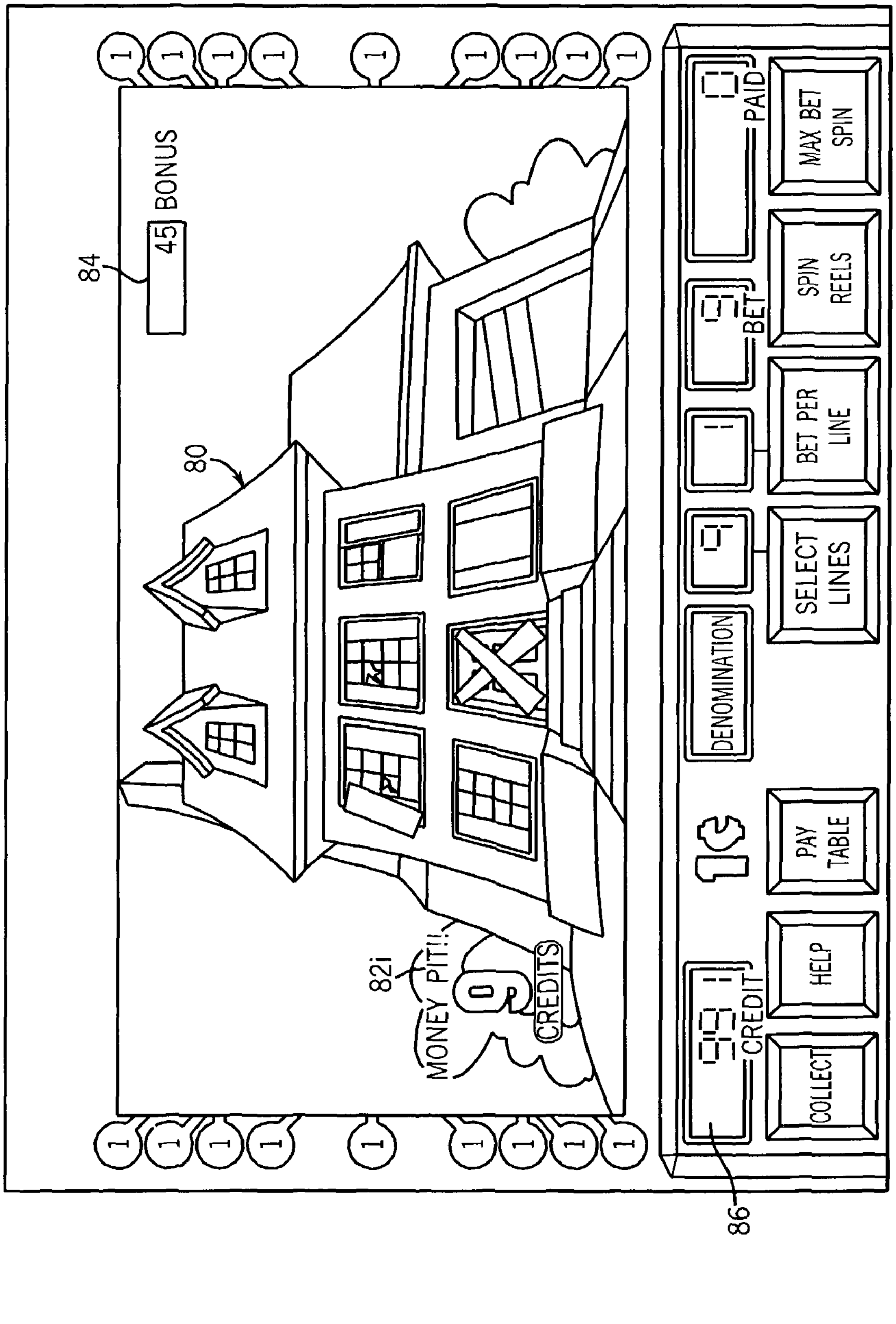

In the example illustrated in FIGS. 14, 15, and 16, the end-feature outcome is assigned to one of the selectable game elements 82. The player selects a window 82*b* with the player's first selection for an award of 18 credits (FIG. 14), selects the roof 82*f* with the player's second selection for an award of 18 credits (FIG. 15), and then selects the landscaping 82*i* with the player's third selection for an award of 9 credits (FIG. 16). The above credit amounts are added to the bonus meter 84.

The selected landscaping 82*i* in FIG. 16, however, also reveals the “MONEY PIT” outcome to end the house repair game feature and cause the CPU to shift operation back to the basic slot game. At the conclusion of the house repair game feature, any credits accumulated in the bonus meter 84 (e.g., 45 credits in FIG. 16) are added to the main credit meter 86.

Figure 17:
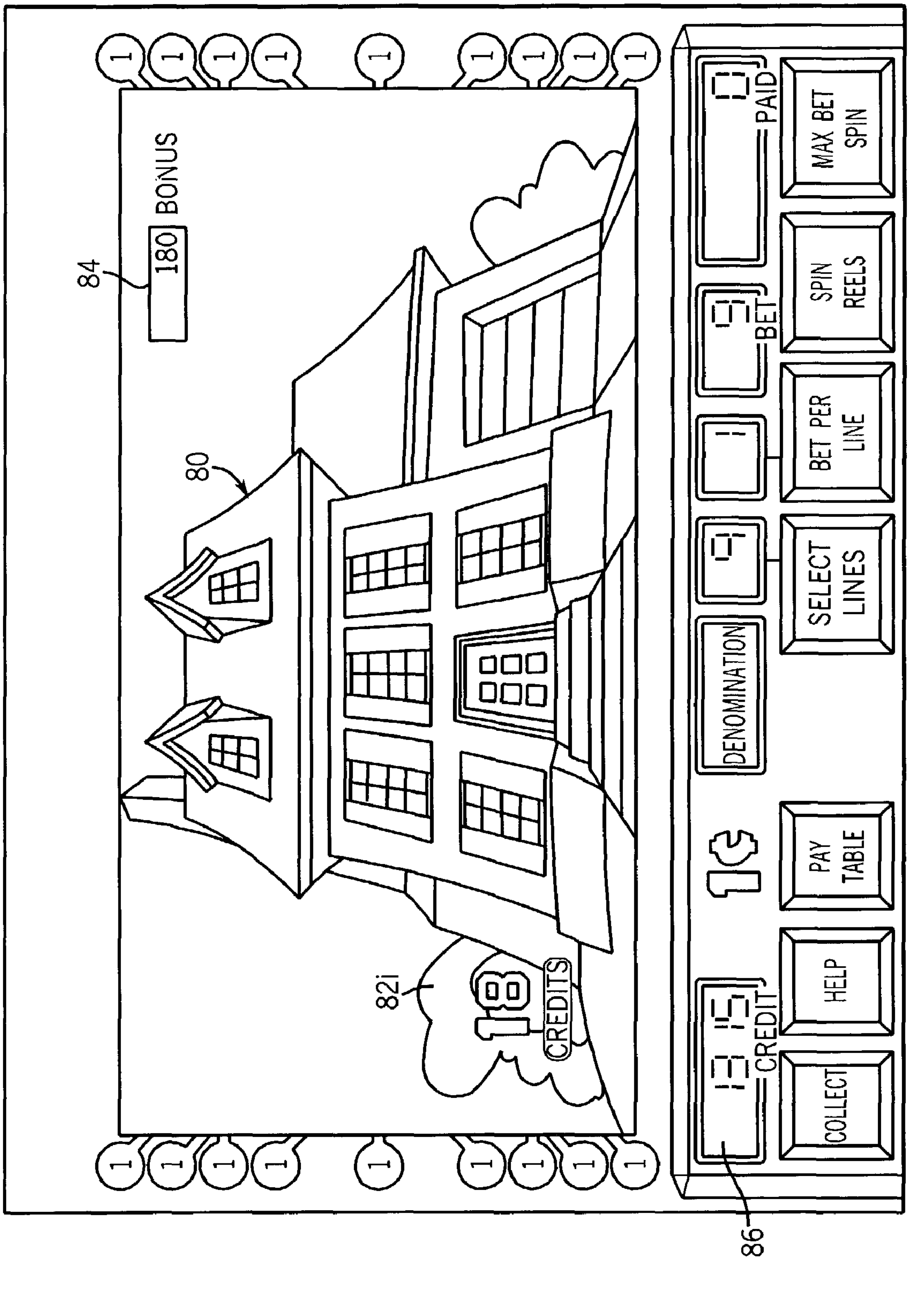

In the example illustrated in FIG. 17, the end-feature outcome is assigned to none of the selectable game elements 82. Therefore, the player is able to select all of the selectable elements 82 (to repair the entire house 80) without encountering the “MONEY PIT” outcome and is awarded a number of credits for each selection. The player’s last selection is shown in FIG. 17, in which the player selects the landscaping 82*i* for an award of 18 credits. After the player’s last selection, the CPU shifts operations back to the basic slot game. At the conclusion of the house repair game feature, any credits accumulated in the bonus meter 84 (e.g., 180 credits in FIG. 17) are added to the main credit meter 86.

When the house repair game feature is initiated, the CPU first determines whether or not an end-feature outcome will be assigned to any of the selectable game elements 82. The CPU is preferably programmed such that there is a 95 percent probability of one end-feature outcome and a 5 percent probability of zero end-feature outcomes among the selectable game elements 82. These probabilities may, of course, be varied. Also, if the number of end-feature outcomes can be more than one as in an alternative embodiment, there may be different or equal probabilities associated with the possible numbers of end-feature outcomes. For example, there may be a 20 percent probability of two end-feature outcomes, a 75 percent probability of one end-feature outcome, and a 5 percent probability of zero end-feature outcomes among the selectable game elements 82. It can be seen that the house repair game feature is dynamic because the number of end-feature outcomes can vary from game to game.

If the CPU determines that there will be a single end-feature outcome, the CPU randomly assigns the end-feature outcome to a particular one of the selectable game elements 82. Each of the selectable game elements 82 has an equal probability of being assigned the end-feature outcome (if there is one). After assigning the end-feature outcome to one of the selectable game elements 82, the remaining game elements 82 are assigned variable credit amounts (continue-feature outcomes) based on the player’s total wager and a weighted table.

In the illustrated embodiment, all selections are preferably made by the player. In an alternative embodiment, the CPU randomly and successively selects the game elements 82 in the array without player input.

While the present invention has been described with reference to one or more particular embodiments, those skilled in the art will recognize that many changes may be made thereto without departing from the spirit and scope of the present invention. Each of these embodiments and obvious variations thereof is contemplated as falling within the spirit and scope of the claimed invention, which is set forth in the following claims.

What is claimed is:

1. A method of conducting a game feature on a gaming machine controlled by a processor, the method comprising:

receiving a wager from a player;

receiving a selection of at least one of a plurality of different revealed indicia, each of the plurality of different revealed indicia having a predetermined relation with indicia borne by each one of a plurality of subsequently displayed selectable game elements having initially concealed indicia; and receiving successive selections from the plurality of selectable game elements having initially concealed indicia until a selected game element reveals an indicia having a predefined bonus-limiting association with the selected revealed indicia.

2. The method of claim 1, wherein the step of receiving successive selections of a plurality of selectable game elements includes receiving the selections until the selected revealed indicia is superseded by the indicia revealed by a selected game element.

3. The method of claim 2, wherein the selected revealed indicia is superseded by a first indicia initially concealed by the selectable game elements, supersedes a second indicia initially concealed by the selectable game elements, and is equivalent to a third indicia initially concealed by the selectable game elements.

4. The method of claim 1, further including providing an award for each selected game element that reveals an indicia having a predefined non-bonus-limiting association with the selected revealed indicia.

5. The method of claim 2, further including providing an award for each selected game element that reveals an indicia that is superseded by the selected revealed indicia.

6. The method of claim 1, further including advancing to a different phase of the game feature when the selected game element reveals an indicia having the predefined association with the selected revealed indicia.

7. The method of claim 1, further including ending the game feature when the selected game element reveals an indicia having the predefined bonus-limiting association with the selected revealed indicia.

8. The method of claim 1, wherein the step of receiving a selection of at least one of the revealed indicia is performed by the player.

9. The method of claim 8, wherein the step of receiving successive selections of the selectable game elements is performed by the player.

10. The method of claim 8, wherein the step of receiving successive selections of the selectable game elements is performed by the processor.

11. The method of claim 3, wherein the revealed indicia include a rock indicia, a paper indicia, and a scissors indicia, and wherein each selectable game element reveals respective indicia upon selection, the indicia being selected from a group consisting of rock indicia, paper indicia, scissors indicia, and other indicia, the rock indicia being superseded by the paper indicia, superseding the scissors indicia, and being equivalent to the rock indicia, the paper indicia being superseded by the scissors indicia, superseding the rock indicia, and being equivalent to the scissors indicia, the scissors indicia being superseded by the rock indicia, superseding the paper indicia, and being equivalent to the scissors indicia.

12. The method of claim 1, wherein said receiving step comprises receiving successive selections of a plurality of selectable game elements until a selected game element reveals an indicia different from the selected bonus limiting indicia and having a predefined association with the selected bonus limiting indicia.

* * * * *